(12) United States Patent
Oates et al.

(10) Patent No.: US 11,077,626 B2
(45) Date of Patent: Aug. 3, 2021

(54) COMPRESSION ROLLER DEVICE

(71) Applicant: HUBER ENGINEERED WOODS LLC, Charlotte, NC (US)

(72) Inventors: Michael John Oates, Charlotte, NC (US); Bradley Karel Halley, Athens, GA (US); Joseph Pruitt, Athens, GA (US); Reuben C. Rudisill, Jefferson, GA (US); Blake Edward Gordon, Atlanta, GA (US); Jose Manuel Gamboa Mata, Alpharetta, GA (US)

(73) Assignee: HUBER ENGINEERED WOODS LLC, Charlotte, NC (US)

( * ) Notice: Subject to any disclaimer, the term of this patent is extended or adjusted under 35 U.S.C. 154(b) by 245 days.

(21) Appl. No.: 15/860,793

(22) Filed: Jan. 3, 2018

(65) Prior Publication Data

US 2019/0105850 A1    Apr. 11, 2019

Related U.S. Application Data

(63) Continuation-in-part of application No. 29/627,558, filed on Nov. 28, 2017, now Pat. No. Des. 862,186.
(Continued)

(51) Int. Cl.
*B30B 11/18*    (2006.01)
*B29C 65/00*    (2006.01)
(Continued)

(52) U.S. Cl.
CPC .......... *B29C 66/306* (2013.01); *B29C 65/526* (2013.01); *B29C 65/80* (2013.01); *B29C 66/01* (2013.01); *C09J 7/38* (2018.01); *E04F 21/1657* (2013.01); *F16B 11/006* (2013.01); *B29C 66/8362* (2013.01); *B29C 66/861* (2013.01); *B29L 2031/10* (2013.01); *B30B 11/18* (2013.01);
(Continued)

(58) Field of Classification Search
CPC ................. B29C 66/306; B29C 66/861; Y10T 156/1788; B30B 11/18
See application file for complete search history.

(56) References Cited

U.S. PATENT DOCUMENTS 3,082,459 A    3/1963 Johnson
3,547,204 A    12/1970 Urban
(Continued)

*Primary Examiner* — Scott W Dodds
(74) *Attorney, Agent, or Firm* — Gardner Groff & Greenwald, PC

(57) ABSTRACT

A compression roller device includes markers on roller heads for pressure-rolling over a substrate to form visual indicia that the substrate has been properly pressure-rolled. In example embodiments, there are two roller heads that each have a set of markers and that are spaced-apart with a handle center-mounted between them. In this way, the roller heads have free/unobstructed outer/opposite edges so they can be positioned closely against an obstructing surface or element for rolling substrates in tight spots with limited clearance. Also, the recess defined between the inner/facing edges of the roller heads provides clearance for rolling over any protruding fasteners securing the substrate in place. Further, the spaced-apart marker sets provide for marking the visual indicia on both sides of a seam/joint between two adjacent panels in a panel-and-tape system to show that both longitudinal side portions of the tape have been pressure-rolled.

20 Claims, 10 Drawing Sheets

Related U.S. Application Data

(60) Provisional application No. 62/568,994, filed on Oct. 6, 2017.

(51) Int. Cl.
*B29C 65/52* (2006.01)
*B29C 65/80* (2006.01)
*C09J 7/38* (2018.01)
*E04F 21/165* (2006.01)
*F16B 11/00* (2006.01)
*B29L 31/10* (2006.01)

(52) U.S. Cl.
CPC .... *C09J 2301/302* (2020.08); *Y10T 156/1788* (2015.01)

(56) References Cited

U.S. PATENT DOCUMENTS

| | | | |
|---|---|---|---|
| 3,568,285 A * | 3/1971 | Lieberg | B27D 3/00 156/579 |
| 4,274,202 A | 6/1981 | Petrick | |
| 4,894,112 A * | 1/1990 | Lippman | B29C 66/1122 156/308.4 |
| 5,242,362 A | 9/1993 | Talamantez | |
| 5,401,231 A | 3/1995 | Herbert | |
| 5,846,176 A | 12/1998 | Zieger et al. | |
| 6,049,970 A | 4/2000 | Reis et al. | |
| 6,135,934 A | 10/2000 | Couch | |
| 6,170,550 B1 * | 1/2001 | Niederberger | B29C 65/02 156/544 |
| 6,536,498 B1 | 3/2003 | Srinivasan et al. | |
| 6,726,640 B2 * | 4/2004 | Ching-Chen | A61H 15/0092 601/107 |
| 6,875,162 B2 | 4/2005 | Barksdale et al. | |
| 7,686,056 B2 * | 3/2010 | Peterson | B29C 66/84121 156/574 |
| 8,112,950 B2 | 2/2012 | Bennett et al. | |
| 8,888,670 B2 | 11/2014 | Grubbs | |
| 2003/0019566 A1 * | 1/2003 | Pate | B29C 66/1122 156/230 |
| 2007/0125475 A1 | 6/2007 | Cecilio et al. | |

* cited by examiner

COMPRESSION ROLLER DEVICE

CROSS-REFERENCE TO RELATED APPLICATIONS

This application claims the priority benefit of U.S. Provisional Patent Application Ser. No. 62/568,994, filed Oct. 6, 2017, and U.S. Design Patent Application Ser. No. 29/627,558, filed Nov. 28, 2017, which are hereby incorporated herein by reference.

TECHNICAL FIELD

The present invention relates generally to pressure-rolling flexible sheet-like materials, and particularly to pressure-rolling of adhesive construction tape to secure it in place.

BACKGROUND

Panel systems are sometimes used in construction projects such as residential and commercial buildings. Such panel system sometimes include a plurality of panels and adhesive tape, with the panels installed adjacent each other and with strips of the tape overlapping the edges of the adjacent panels to form a continuous layer without any gaps. For example, the ZIP SYSTEM sheathing-and-tape system (Huber Engineered Woods LLC of Charlotte, N.C.) includes sheathing panels each with a barrier that prevents bulk water from passing through and intruding into the enclosed building space but that permits vapor to pass through and escape the enclosed space, and rolls of tape that prevent water and vapor from passing through, to allow the enclosed building space to "breathe" while still keeping out liquid water. Such panel-and-tape systems are disclosed in U.S. Pat. No. 8,112,950, issued Feb. 4, 2012, which is incorporated by reference herein. As disclosed, such panel-and-tape systems can include panels that are about 4 feet by about 8 feet in area and with tape that is about 3.75 inches wide and about 0.012 inch thick.

An issue with such panel-and-tape systems is that if the adhesive tape is not installed properly, then it might not function as well as intended and some rework may be needed. And, it is not always readily apparent from a quick glance if the tape has been properly installed.

Accordingly, it can be seen that there exists needs for improvements in panel-and-tape systems and/or methods of installing them. It is to the provision of solutions to this and other opportunities that the present invention is primarily directed.

SUMMARY

Generally described, the present invention relates to a compression roller device having markers on roller heads for pressure-rolling over a substrate to form visual indicia that the substrate has been properly pressure-rolled. For example, the depicted compression roller is adapted for use to pressure-roll construction tape of the type used in panel-and-tape systems to ensure the tape covering the seam/joint between adjacent panels is properly adhered to the underlying panels without penetrating the tape. Other compression rollers are adapted for use in pressure-rolling other sheet-like substrates and/or for applications other than construction.

In example embodiments, there are two roller heads that each have a set of markers and that are spaced-apart with a handle center-mounted between them. In this way, the roller heads have free/unobstructed outer/opposite edges so they can be positioned closely against an obstructing surface or element for rolling substrates in tight spots with limited clearance. Also, the recess defined between the inner/facing edges of the roller heads provides clearance for rolling over any protruding fasteners securing the substrate in place. Further, the spaced-apart marker sets provide for marking the visual indicia on both sides of a seam/joint between two adjacent panels in a panel-and-tape system to show that both longitudinal side portions of the tape have been pressure-rolled.

The specific techniques and structures employed to improve over the drawbacks of the prior art and accomplish the advantages described herein will become apparent from the following detailed description of example embodiments and the appended drawings and claims.

DESCRIPTION OF EXAMPLE EMBODIMENTS

The present invention relates to compression roller devices for applying pressure to a flexible sheet-like element in such a way that a visual indication is provided that the sheet has been properly pressure-rolled. In example embodiments, the compression rollers are designed for pressure-rolling adhesive tape used in construction. For example, the compression rollers can be used on tape having a pressure-adhesive backing, or on tape that is adhered in another way such as a separately applied adhesive. Thus, the compression rollers can be used for compression-adhering tape of the type used in panel-and-tape systems or for other compression-adhering tape used in construction projects such as conventional flashing tape.

It will be understood that the compression rollers can alternatively be used for, or adapted for being used for, applying pressure to other (than tape) sheet-like elements (e.g., radiant barriers, weather sheathing, decorative sheets, and/or protective layers) and providing a visual indication that the sheeting element has been properly pressure-rolled. It will be further understood that the compression rollers can be designed for and used in applications other than construction. As such, although example embodiments are described herein in the context of adhesive tape used in construction applications, it will be understood that other embodiments and applications are contemplated and within the scope of the invention.

Furthermore, reference herein to a proper pressure-rolled installation means the proper pressure has been applied for example for sufficient adhesion for a long-term intended use without penetrating or otherwise damaging the sheet material, the proper surface area has been compression-rolled for example both longitudinal tape portions overlapping both sides of a panel junction, and/or the proper pressure and/or surface area has been applied/rolled for other results for example removing air bubbles or applying a decorative pattern, whether in panel-and-tape systems or other applications.

Figure 1:
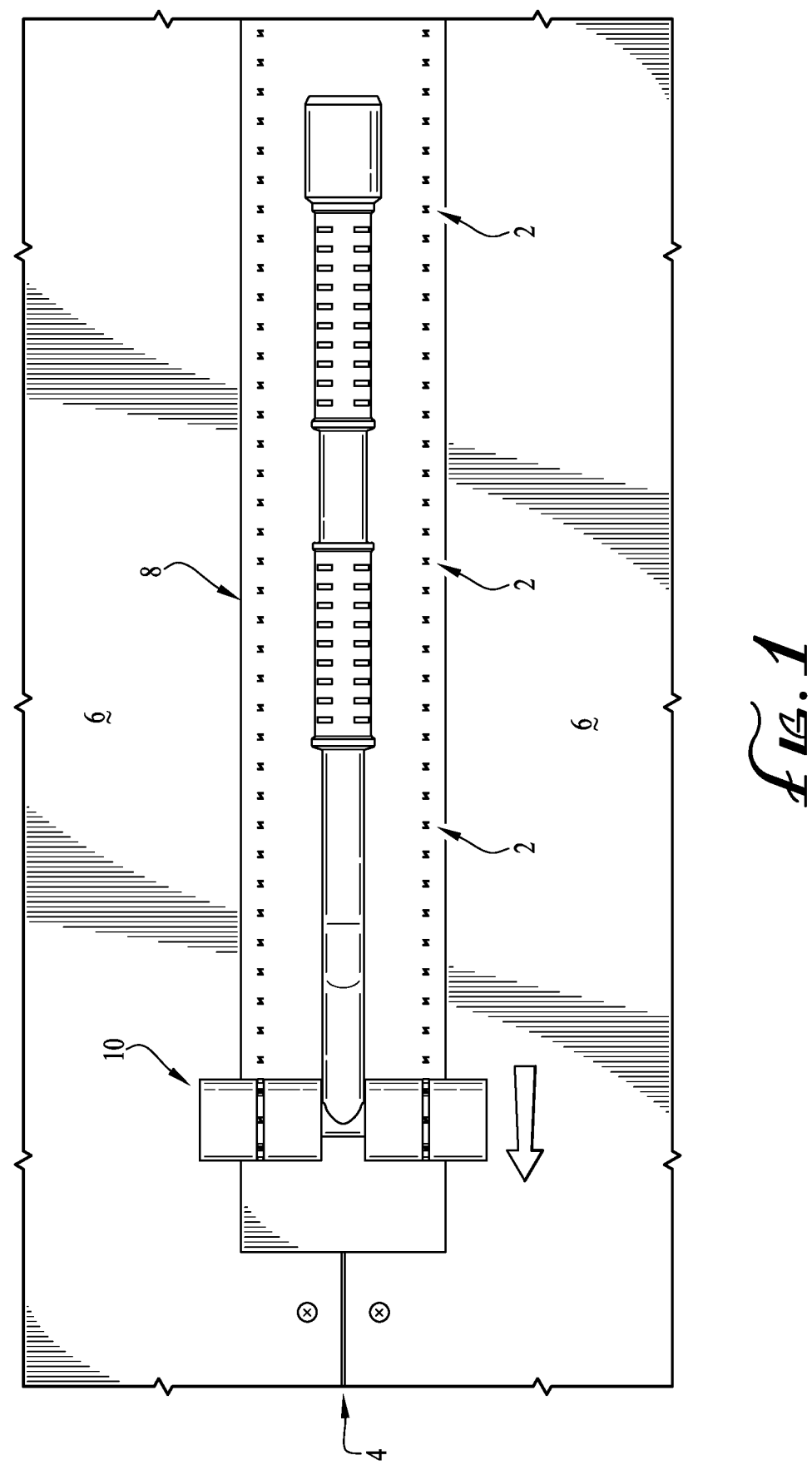
FIG. 1 is a top perspective view of a compression roller device according to a first example embodiment of the present invention, shown in use rolling a strip of adhesive tape.

FIGS. 1-11 show a compression roller device 10 according to a first example embodiment of the present invention. FIG. 1 shows the roller 10 in use installing a panel-and-tape system for building construction. The roller 10 is shown rolling over and compressing a strip of flexible adhesive tape 8 positioned overlapping two panels 6 that are adjacent to each other in order to cover and seal the joint 4 between the adjacent panels 6. As can be seen, the portion of the tape 8 that has been rolled (as indicated by the right-to-left directional arrow) is marked with a series of visual indicia 2 showing that the tape 8 has in fact been pressure rolled and with sufficient force to pressure-adhere the tape 8 to the adjacent panels 6.

FIGS. 2-11 show details of the structural components of the compression roller device 10. The roller 10 includes a handle 12 and a roller assembly 14 that are generally transverse to each other. The handle 12 includes a proximal/user portion 16, a distal/roller portion 18, and an intermediate portion 20 between the proximal and distal portions. The proximal portion 16 includes one or more grips 22 (e.g., two serially arranged grips for two-handed grasping) for manually grasping by a worker for use. The distal portion 18 attaches to the roller assembly 14. And, the intermediate portion 20 is for extension purposes and is, thus typically, generally elongate (e.g., tubular or bar-shaped).

Figure 3:
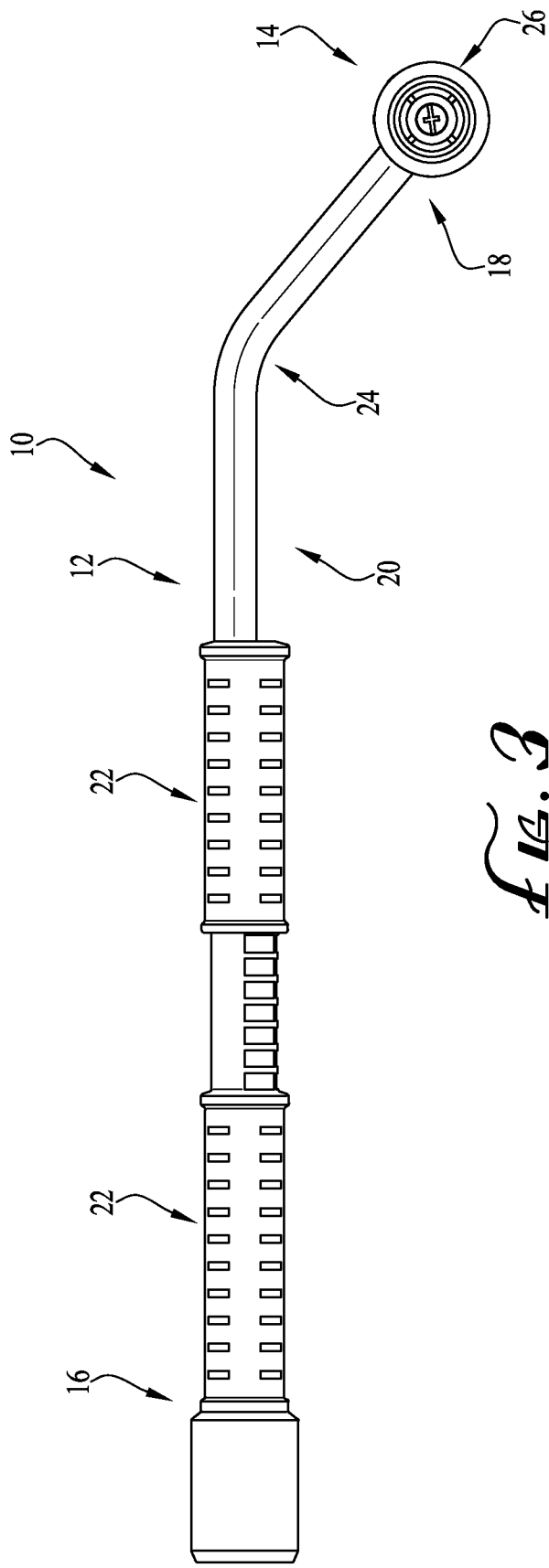
FIG. 3 is a side view of the compression roller of FIG. 1.

In typical embodiments, the handle 12 has an overall/total length selected for holding and using the roller 10 while kneeling (e.g., on a roof) or while standing (e.g., for wall installations). As such, the handle 12 typically has a length of about 1.0 feet to about 3.0 feet, for example, about 1.5 feet. In addition, the handle 12 can include an angle 24 for enabling a worker to grasp the grips 22 with two aligned hands in a comfortable position and still apply pressure to the roller 10. For example, the handle 12 can include an angle 24 of about 135 degrees (i.e., 45 degrees from a generally straight 180-degree handle) in its intermediate portion 20, as shown in FIG. 3. Furthermore, the depicted roller 10 with two grips 22 can be grasped and used with two hands or with one hand (e.g., by choking up on the handle). In other embodiments, the handle has an overall/total length selected so that an average-sized adult can stand upright holding the roller with the roller assembly down at foot level, without a bend, and/or with another type, position, or number of the grips.

Furthermore, the handle 12 can be made of a single integral piece or it can include multiple lengths that detachably couple together. For example, the handle 12 can include two serially arranged grips with a coupling (e.g., with mating threads) between them so that the handle can be separated into two pieces so that the roller 10 can be arranged in a longer two-piece configuration (with the extension/second grip attached) for example for stand-up two-handed use or in a shorter one-piece configuration (without the extension/second grip) for example for one-handed use (e.g., for standing use for wall installations or for kneeling use for roof installations. And, in some embodiments, the proximal portion includes an end coupling component (e.g., a threaded axial bore) for attaching an extension pole (e.g., with mating external threads).

The handle 12 can be made, for example, of polypropylene with fiberglass fill for reinforcement using conventional molding techniques and equipment. Alternatively, the handle 12 can be made of another hard plastic, a metal, a composite, or other conventional materials, and/or using other conventional manufacturing techniques. And, the handle 12 (at least portions of it) can have generally U-shaped longitudinal cross-section with transverse ribs included for strength. It will be understood that the handle can alternatively be provided by many other conventional handle structures and/or grips of types known to persons of ordinary skill in the art.

The roller assembly 14 includes two roller heads 26 that are rotationally mounted to the distal portion 18 of the handle 12 on opposing sides thereof (i.e., with the distal portion of the handle positioned between the two rollers). For example, the roller heads 26 can be mounted on an axle 28 that extends through or into a transverse bore in the handle distal portion 18. In various embodiments, one steel axle 28 extends all the way through the handle distal portion 18 (see FIG. 5) or two steel axles are provided with each extending from a respective opposite side of the handle distal portion (e.g., with a steel inner-threaded hub) and attached thereto (e.g., by an outer-threaded end or coupling). In various embodiments, the roller heads 26 rotate relative to the axle 28, the axle rotates relative to the handle distal portion 18, or both. The roller heads 26 can be secured onto the axle 28, for example, by end-positioned fasteners 34 such as the depicted bolts screwed into threaded axial bores in the ends of the axle (see FIGS. 5-6).

Figure 5:
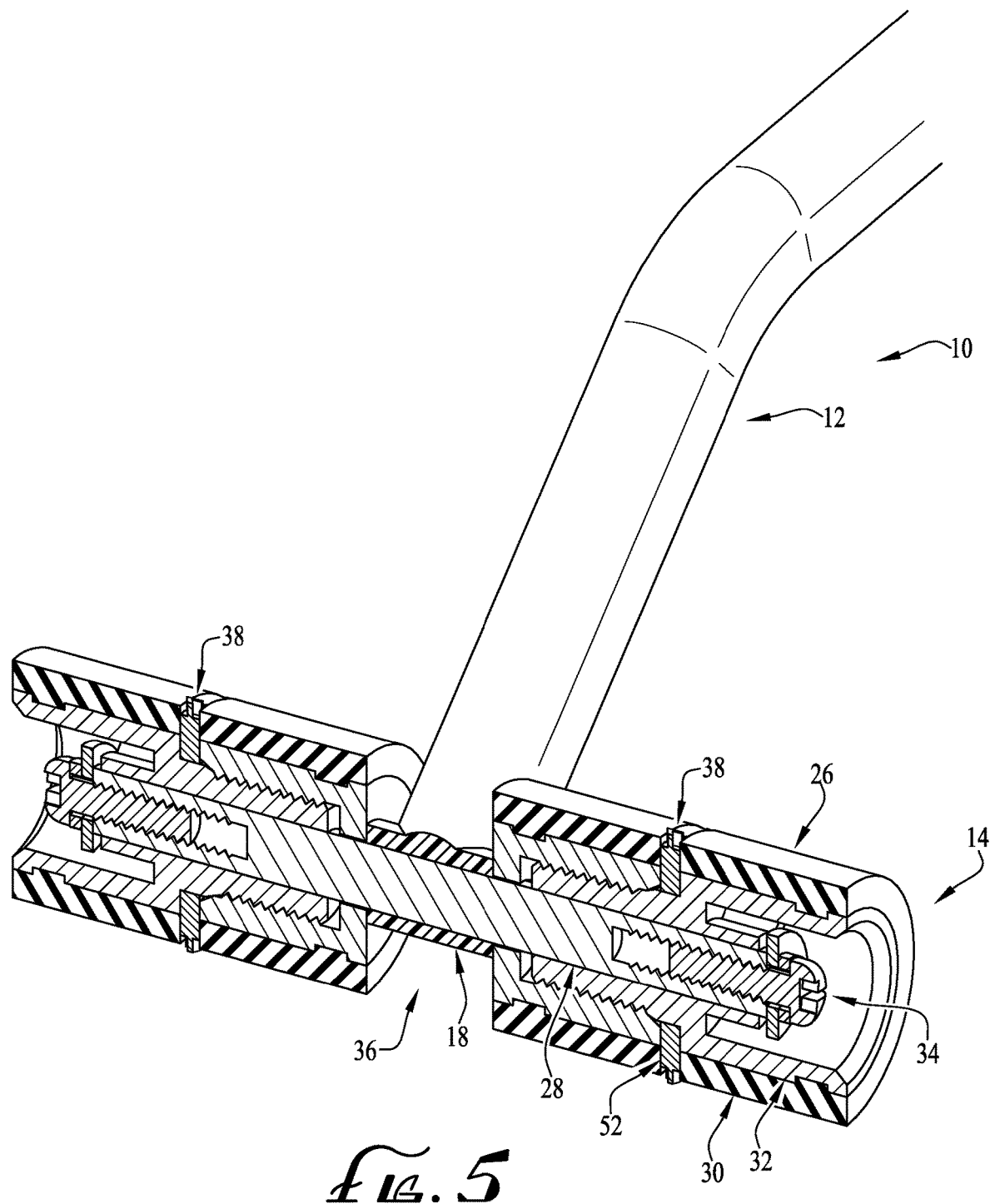
FIG. 5 is a perspective view of a distal/roller portion of the compression roller of FIG. 1, with the roller assembly shown in cross-section.
Figure 6:
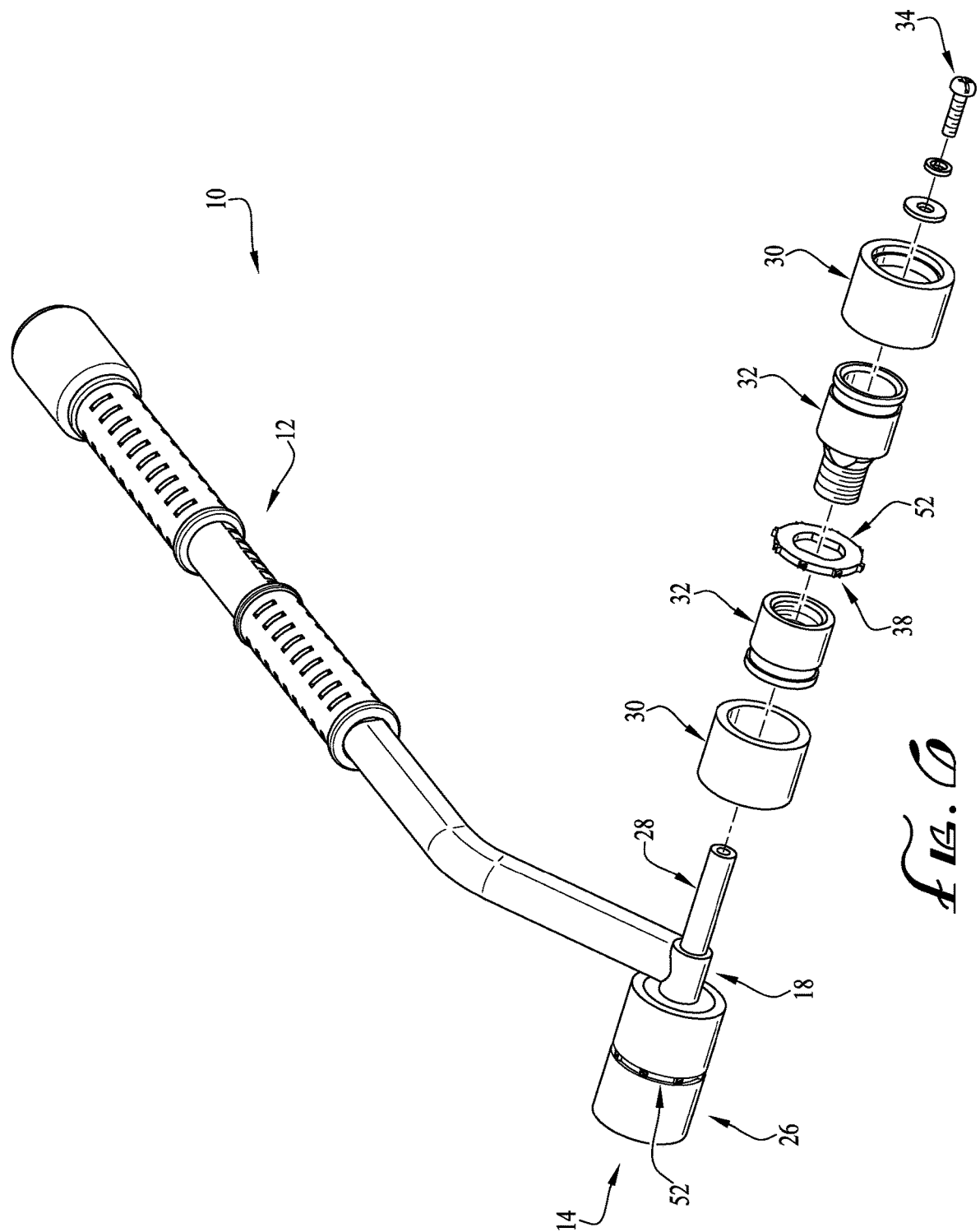
FIG. 6 is a perspective view of the compression roller of FIG. 1, with one of the rollers shown in an exploded/unassembled configuration.
Figure 7:
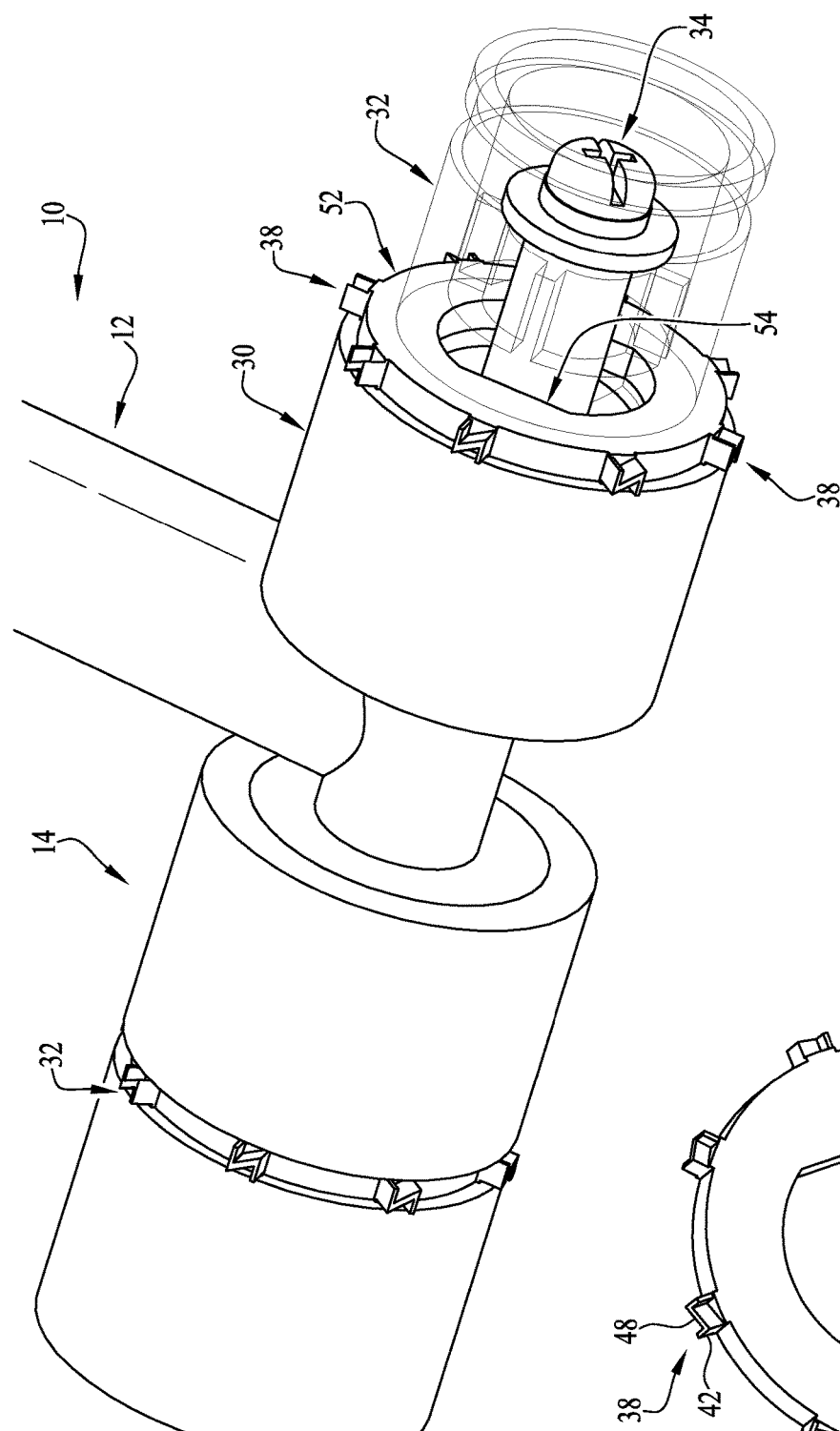
FIG. 7 is a perspective view of a distal/roller portion of the compression roller of FIG. 1, with a shell of one of the rollers removed to reveal interior components.

Also, the roller heads 26 can each include a relatively soft cylindrical shell 30 mounted onto a relatively rigid core 32, as depicted (see FIGS. 5-7). For example, the cylindrical shell 30 can be made of a relatively soft material such as a rubberized material, and the core 32 can be made of a relatively rigid material such as steel or another metal. In other embodiments, each of the roller heads is provided as a one-piece unitary part.

The roller heads 26 are axially aligned and spaced apart in a lateral direction, with the handle distal portion 18 positioned laterally between and mounted to them. As such, the handle 12 is typically attached to the roller assembly 14 at about a lateral midpoint of the roller assembly 14 (for balance and stability in use). Unlike conventional roller devices having two spaced-apart arms attached to opposite outside ends of the roller heads, the roller 10 can be used to roll-compress the tape 8 in non-flat space-restricted locations. For example, the roller 10 can be used to roll-compress the tape 8 at non-flat junctions or corners formed by adjoining roof sections at different pitches, by adjoining angled wall sections (e.g., at 90 degrees), at other angled panel-to-panel joints/seams, at window and door jambs, and at roof penetrations (e.g., flashings for vents). In particular, because the outer opposite ends 44 of the roller heads 26 have no handle-mounting element obstructing or positioned outward of them (see FIG. 4), they can be placed snug/flush against an adjacent surface (e.g., of a panel or window/door frame that is angled relative to the tape being rolled) for roll-compressing the tape 8 covering that junction. For example, this can be done by using one roller head 26 to roll one longitudinal half of the tape 8 (with that roller head's outer end 4 adjacent the seam/joint, and with the other roller head 26 extending laterally beyond and not rolling the tape 8), and then repositioning the roller 10 to use one roller head 26 to roll the other longitudinal half of the tape 8.

Figure 2:
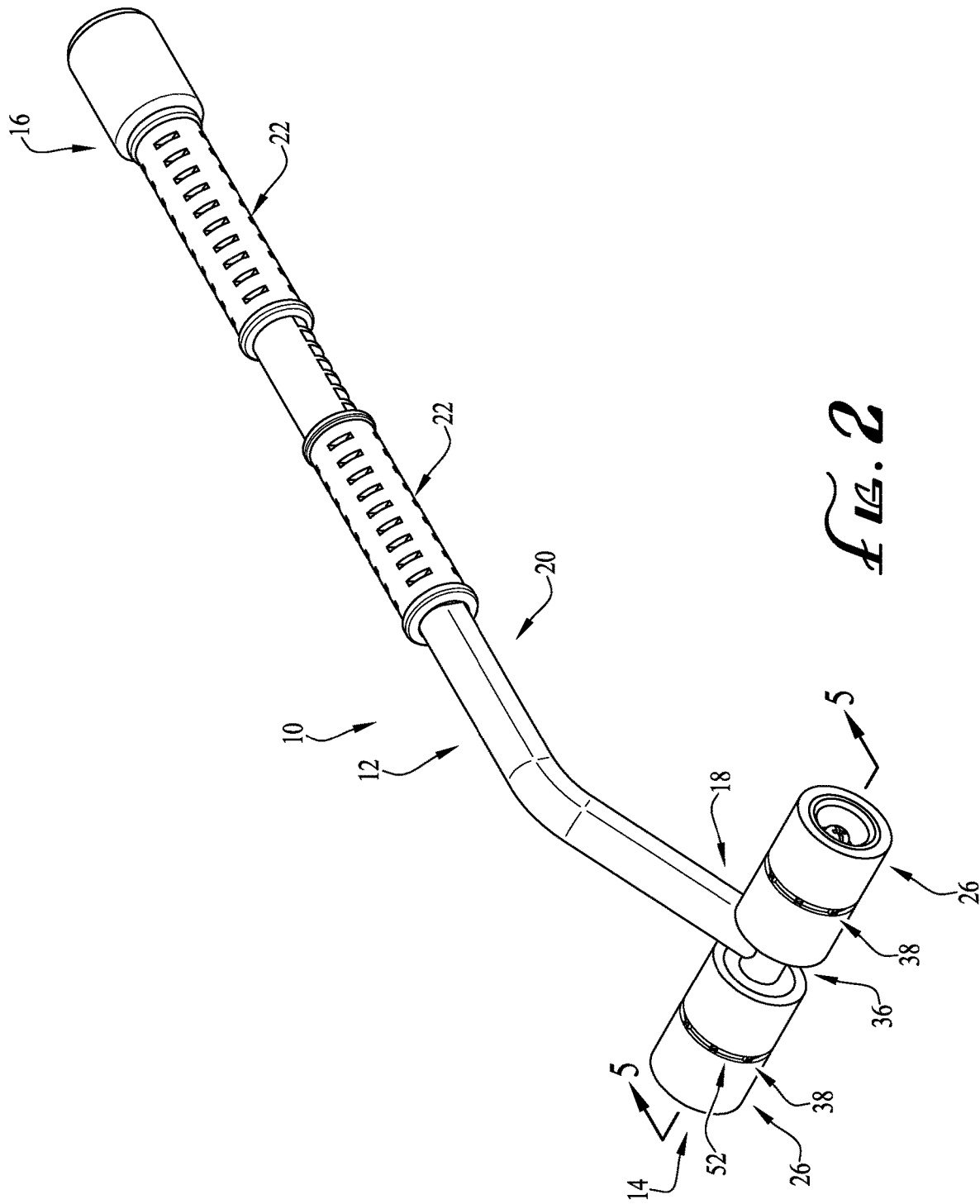
FIG. 2 is a perspective view of the compression roller of FIG. 1.
Figure 4:
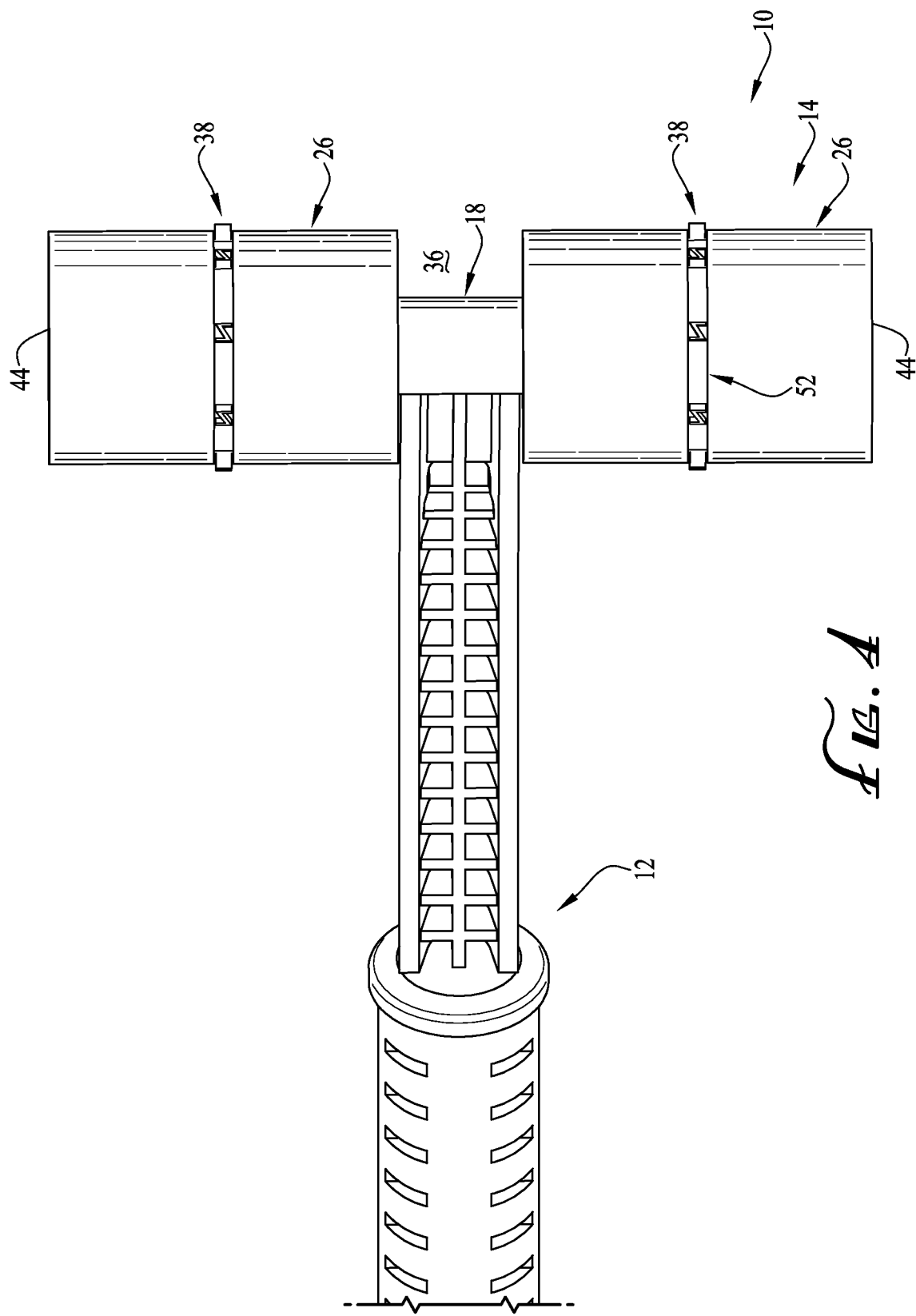
FIG. 4 is a bottom perspective view of a distal/roller portion of the compression roller of FIG. 1.

In addition, the roller heads 26 extend distally farther than the handle distal portion 18 so that a recess (notch or gap) 36 is formed between the roller head inner/facing edges and the handle (see FIGS. 2 and 4). The radial dimension of the roller heads 26 extending beyond the distal portion 18 of the handle 12 defines the depth of the recess 36. In typical embodiments, the roller heads 26 extend beyond the handle distal portion 18 to form a recess depth of, for example, about 0.25 inch to about 0.75 inch, typically about 0.50 inch. And the spacing between the roller heads 26 (i.e., the lateral dimension of the handle distal portion 18 between the two roller head inner/facing edges) defines the width of the recess 36. In typical embodiments, the roller heads 26 are spaced apart in a lateral direction by to form a recess width of, for example, about 0.5 inch to about 1.0 inch, typically about 0.75 inch. The panels are typically secured in place by conventional fasteners (e.g., nails, screws, or other conventional mechanical attachment elements) 3 positioned along and adjacent the panel edges (adjacent the seam/joint between the panels), and this recess 36 provides a clearance (depth and width) location for receiving any "proud" fasteners 3 (i.e., that have not been installed flush with the panel) while smoothly pressure-rolling over the laterally outward longitudinal portions of the tape 8 on both side of those fasteners 3 (see FIG. 10). Furthermore, the roller heads 26 are typically mounted to the handle 12 so that they roll independently of each other, for example as detailed above. In this way, the two roller heads 26 can roll smoothly over two adjacent panels 6 that are slightly uneven, while maintaining good pressure on both portions of the tape overlapping both adjacent panels.

The roller heads 26 each include at least one marker 38 for forming a visual indicia 2 on the tape 8 that it has been rolled with sufficient force for it to properly adhere. Typically, each of the roller heads 26 includes a plurality of the markers 38, such as the eight markers per roller head 26 in the depicted embodiment. For example, each of the markers 38 is typically provided by a stamp that protrudes radially outward beyond the respective roller head 26 such that the stamp forms an indentation mark 2 in the tape 8 upon being rolled over the tape 8 but does not puncture/penetrate (all the way) through the tape 8. The stamp markers 38 thus form the indentation mark indicia 2 in a repeating serial manner along the length of the tape 8, with one indentation 2 formed by each marker 38 every roller-head revolution. In other embodiments, the markers are provided by a recess for forming a raised/embossed indicia on the rolled tape, by a dispenser for applying visual indicia in the form of an ink, stain, chemical reactant, or supplemental adhesive layer, or by another conventional mechanism for providing the functionality disclosed herein. And in still other embodiments, the markers are provided by stamps that penetrate the tape in use for other types of applications.

The shape and size of the markers 38 is selected to form the indentation indicia 2 so that they are readily visually discernable to the naked eye in typical daylight conditions, with the shape of the markers being a mirror image of (conforming to) the intended indentation shapes. Typically, the markers 38 are selected to form an indentation indicia 2 with a shape that does not normally occur in nature, at least not in the intended end-use application/environment (to visually differentiate obviously man-made markings from naturally occurring markings), that tends to reflect light well (for enhanced visibility when viewing straight-on), and/or that tends to retain its shape over time (e.g., for at least six months until cladding can be installed over it, for a 30-year guarantee period, and/or for the rated lifetime of a panel system). Thus, the markers 38 can include two or more linear portions that are angled relative to each other, for example three linear portions that are acutely angled relative to each other, such as the depicted Z-shaped markers (see FIGS. 7-8). And the outer surface 48 of the markers 38 is typically generally perpendicular to the extension surface 42 of the markers 38, with the sharp edges of these generally right angles tending to reflect light for ease of visibility (see FIG. 8). Also, the outer surface 48 of the markers 38 can be generally flat (as depicted) or it can include a recessed interior portion (e.g., formed by peripheral wall portions) to form a two-leveled indentation in the tape. Other shapes of the markers 38 contemplated by and intended to be covered within the scope of the invention include numbers, other letters, geometric shapes, and combinations of these.

With respect to the size of the markers 38, in embodiments in which the markers 38 are relatively smaller, the roller heads 26 typically include relatively more of them to provide the desired visual discernability. And in embodiments with relatively larger-sized markers 38, relatively fewer of them can be provided. For illustrative and representative purposes, the markers 38 can be about 0.25 inch by about 0.25 inch, with eight markers provided. Also, the markers 38 can be arranged in alignment circumferentially around the roller head 26, as depicted. With the markers 38 arranged in alignment circumferentially around the roller head 26, they form a linear series of the indicia 2 (see FIG. 1), with this linear aspect tending to make the indicia 2 easier to spot. In other embodiments, more or fewer markers 38 are provided, in larger or smaller sizes. And the markers 38 can be arranged not in circumferential alignment but instead in an array or in another regular or irregular arrangement.

Figure 10:
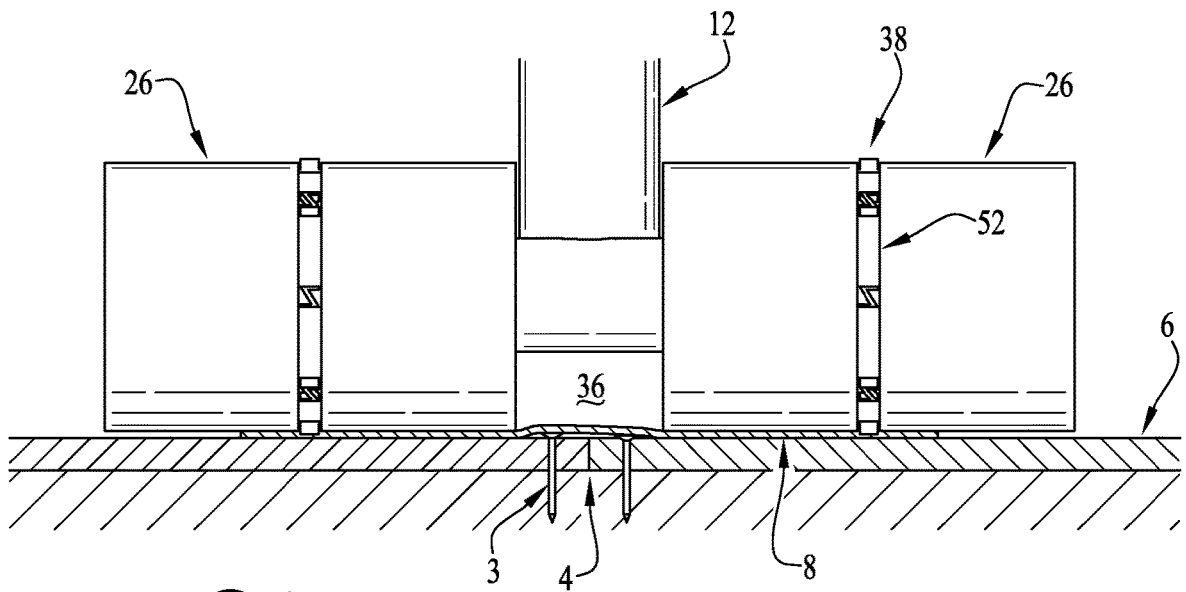
FIG. 10 is a distal/roller end view of the roller assembly of the compression roller of FIG. 1, showing two sets of the markers forming two series of visual indicia on the tape while straddling the underlying panel junction and panel fasteners during use.

In typical embodiments, each of the roller heads 26 includes at least one of the markers 38, with the overall axial width of the roller assembly 12 (between the outer/opposite ends 44 of the two roller heads 26) being about the same as or greater than the width of the tape 8 to be rolled, and with the two markers 38 being laterally spaced apart by less than the width of the tape 8 and positioned laterally inward from the outer/opposite ends of the roller heads 26 (see FIG. 10). For example, conventional rolls of pressure-adhesive construction tape 8 of the type used in conventional panel-and-tape systems are typically provided in widths of about 3.5 inches to about 4.0 inches (e.g., about 3.75 inches) and of the type used for flashings are typically provided in widths of about 3.0 inches to about 9.0 inches. So for use with such conventional tape 8 for panel-and-tape systems, the roller assembly 12 typically has an axial width that is greater than this tape width and the markers 38 are laterally spaced apart by less than this tape width and positioned laterally inward from the outer/opposite ends 44 of the roller heads 26. In typical embodiments, the roller assembly 12 has an axial width (between the outer/opposite ends 44 of the two roller heads 26; combined width of roller heads plus interposed recess 36) of about 4.5 inches to about 6.0 inches (e.g., about 5.25 inches), the markers 38 are laterally spaced apart by about 2.75 inches to about 3.25 inches (e.g., about 3.0 inches), and the markers 38 are positioned laterally inward from the roller outer/opposite ends by about 0.75 inches to about 2.25 inches (e.g., about 1.5 inches). This allows for both sets of roller-head markers 38 to be rolled over the tape 8, with extra space (e.g., about 0.25 inch to about 0.5 inch) on each outer side, so that the user does not have to perfectly center the roller assembly 12 on the tape 8 when rolling it (see FIG. 10). Also, this enables the two sets of markers 38 to be rolled over both adjacent panels 6 while straddling the panel junction 4 to provide the visual indication 2 that the tape 8 has been compression-rolled to both panels 6 (see FIG. 10). And this avoids the markers 38 rolling over the fasteners (e.g., nails or screws) 3 installed in the panels 6 and laterally offset (typically less than about 1.0 inch) from the adjacent edges of the panels 6 (see FIG. 10). In other embodiments, the roller assembly has an axial width that is less than the width of the tape and the roller can be used to make multiple passes over the tape to pressure-roll its entire width.

Moreover, the roller heads 26 and markers 38 are designed to form the indentation marks 2 only upon the proper force being applied to the tape 8 by the roller assembly 12 to provide for correct installation and adherence of the tape, as described above. For conventional adhesive tape 8 used in panel-and-tape systems, such a force is typically a minimum of about 4.5 lbf (e.g., based on ASTM peel adhesion testing) and in practice commonly on the order of a minimum of about 10 lbf.

To enable the desired functionality of forming the indentation marks/indicia 2 as disclosed herein, the roller heads 26 can have an outer contacting/compressing surface (e.g., formed by the cylindrical shell 30) made of material that is softer than the material of the markers 38. In typical embodiments, the roller heads 26 (at least the outer surfaces) are made of a resilient material such that when proper application force is applied to the roller heads 26 they resiliently deflect radially inward slightly, thereby providing for a smooth rolling operation over adjacent panels 6 that are not flat, even, and/or coplanar relative to each other. Thus, the roller heads 26 (or at least their cylindrical shells 30) can be made of thermoplastic rubber (TPR) and the markers 38 made of pewter or another metal with a significantly greater hardness. In such example embodiments, the roller heads 26 (or at least their cylindrical shells 30) can have a hardness of typically about Shore 20A and about Shore 90A, preferably about Shore 50A and about Shore 70A, and most preferably about Shore 60A.

Additionally or alternatively, the outer surfaces 48 of the markers 38 can extend radially outward beyond the outer surface 46 of the roller heads 26 to provide the compression stamping effect. However, to avoid the stamp markers 38 puncturing the tape 8, the markers typically extend beyond the roller heads by a protruding height H that is less than the thickness T of the tape to be compression-rolled (see FIGS. 9 and 11). For example, conventional pressure-adhesive construction tape 8 of the type used in conventional panel-and-tape systems and of the type conventionally used for flashings is typically provided with a thickness T of about 0.008 inch to about 0.050 inch. So for use with such conventional tape 8 of panel-and-tape systems, the markers 38 typically have a protruding height H of about 0.002 inch to about 0.012 inch. These representative dimensions are based on the intended in-use condition of the roller 10, so for embodiments with the roller heads 26 (or at least their cylindrical shells 30) made of a resilient material, they are based on when proper application force is applied to the roller heads causing them to resiliently deflect radially inward slightly, and in an at-rest neutral condition (when not in use) the markers may be flush with the outer surface of the roller heads.

Figure 8:
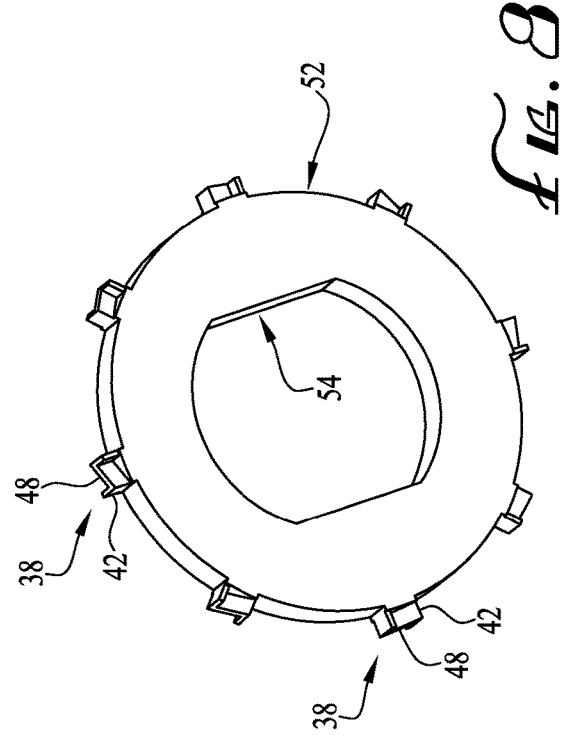
FIG. 8 is a perspective view of a marking ring of the compression roller of FIG. 7.
Figure 9:
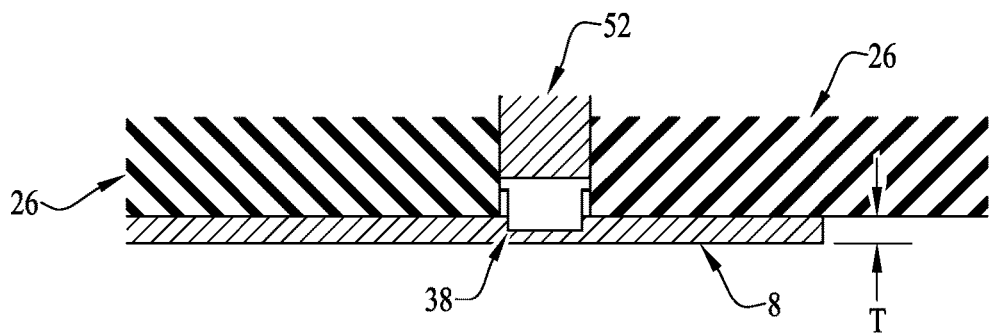
FIG. 9 is a distal/roller end view of a portion of one of the rollers of the compression roller of FIG. 1, showing the markers forming visual indicia on the tape during use.

Furthermore, the markers 38 can be included on and extend radially outward from a marking ring 52 (see FIGS. 7-8). The marking ring 52 can be mounted and keyed 54 (to prevent rotation independently of the roller head 26) to the respective roller head core 32 (as depicted), axle 28, or other component. Also, each of the roller heads 26 can include two roller-heads segments with a marking ring 52 positioned between them, for example the roller-head segments can be substantially identical with the marking ring thus positioned at the axial midpoint of the roller head.

Figure 11:
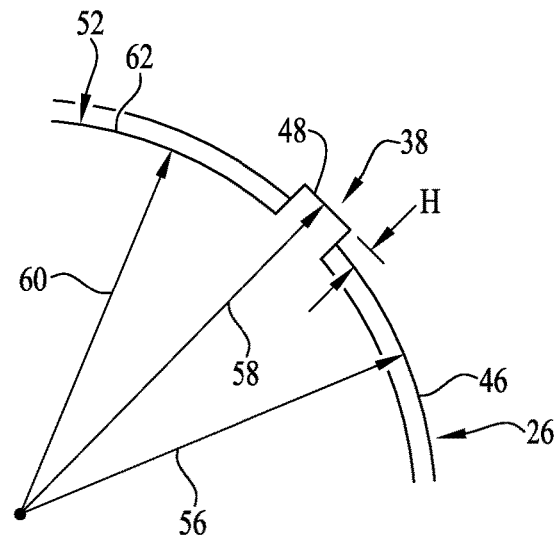
FIG. 11 is an end view of a portion of one of the rollers of the compression roller of FIG. 1, showing one of the markers protruding beyond the roller surface.

The outer surface 46 of the roller heads 26 has a radius 56 that is less than (or substantially the same as) the radius 58 of the outer surface 48 of the markers 38 and greater than (or substantially the same as) the radius 60 of the outer surface 62 (excluding the markers) of the marking ring 52 (see FIG. 11). These dimensions can be selected to provide the marker protruding height H and functionality as described above. For example, the roller-head radius 56 can be about 0.70 inches to about 0.74 inches (e.g., about 0.72 inch), the marker radius 58 can be about 0.71 inches to about 0.75 inches (e.g., about 0.73 inch), and the marking-ring radius 60 can be about 0.56 inches to about 0.60 inches (e.g., about 0.58 inch).

In this way, use of the compression roller 10 during installation of pressure-adhesive tape 8 provides for quality assurance to make sure no sections of tape go unrolled. Moreover, use of the compression roller 10 can provide later benefits for example if a product and/or insurance claim arises when trying to determine if the panel-and-tape system was installed correctly.

In another aspect, the invention relates to methods of installing adhesive tape and other sheet-like materials to provide for adherence of the tape/sheet in place and/or to provide a visual indication that the tape/sheet has been properly installed. An example embodiment includes use for installing a panel-and-tape system forming a roof or wall. At least two panels are installed adjacent each other forming a joint/seam between them, an adhesive tape is installed covering the joint/seam and overlapping the adjacent panels, and the compression roller is rolled over the tape to properly adhere it to both adjacent panels. The compression roller, the panels, and/or the adhesive tape can be of any type described herein or of another similar type.

In method embodiments for installing panel-and-tape systems, the step of compression-rolling the adhesive tape 8 can thus include rolling the roller 10 over uneven panels 6 with each roller head 26 rolling independently of the other for smooth operation over the uneven panels while maintaining good pressure on both portions of the tape 8 overlapping both adjacent panels 6. This can also include moving the roller 10 along the tape 8 so that the markers 38 of the roller heads 26 roll into contact with the tape 8, roll further to press the indentation indicia 2 in the tape 8 (or otherwise mark the tape), roll further out of contact with the tape 8, and repeat the process as the roller heads 26 revolve through each 360 cycle in a repeating manner to form a series of the indentations/indicia 2 in the tape 8.

This can also include compression-rolling the tape 8 at non-flat junctions 4 with the outside ends 44 of the roller heads 26 placed generally snug/flush against (i.e., immediately adjacent but not contacting/rubbing against) an adjacent angled surface. And this can further include compression-rolling (and marking) both the tape portions 4 overlapping both the adjacent panels 6 while proud fasteners 3 in the panels 6 are received through a recess 36 between the roller heads 26 and thus not compression rolled. Related and other method steps are described throughout this application when describing the structural features of the roller 10.

Figure 12:
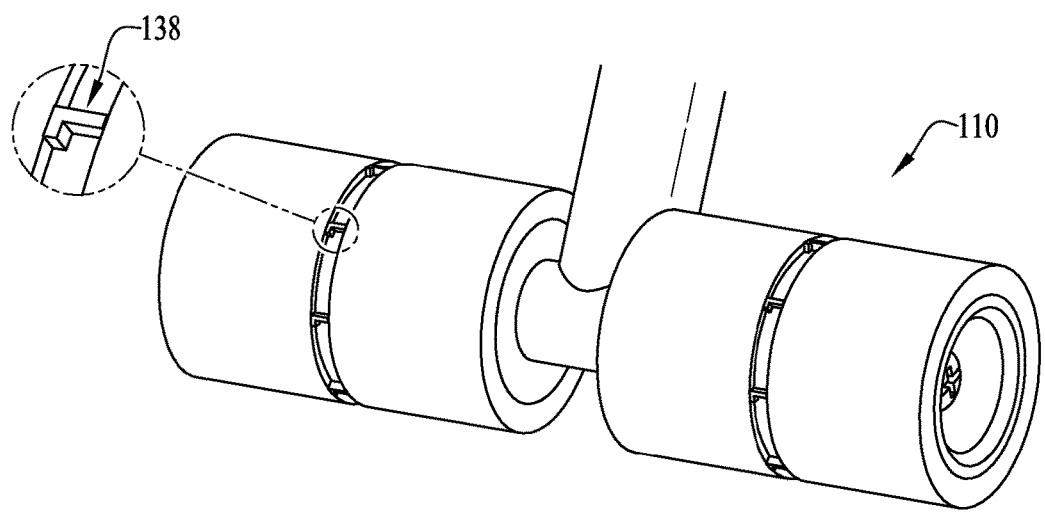
FIG. 12 is a perspective view of a distal/roller portion of a compression roller device according to a second example embodiment of the present invention, showing the markers being L-shaped.
Figure 13:
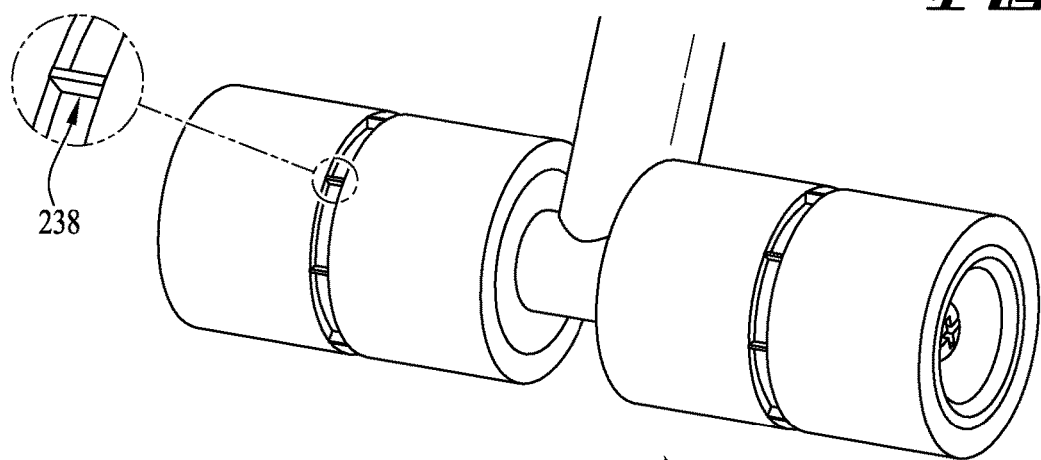
FIG. 13 is a perspective view of a distal/roller portion of a compression roller device according to a third example embodiment, showing the markers being I-shaped.
Figure 14:
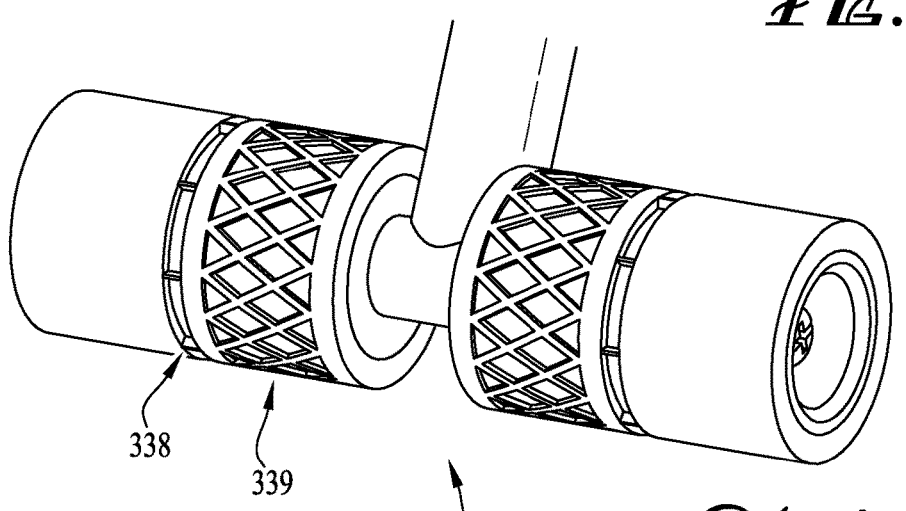
FIG. 14 is a perspective view of a distal/roller portion of a compression roller device according to a fourth example embodiment, showing the markers being I-shaped and the rollers having marking surfaces with a repeating-diamond pattern.
Figure 15:
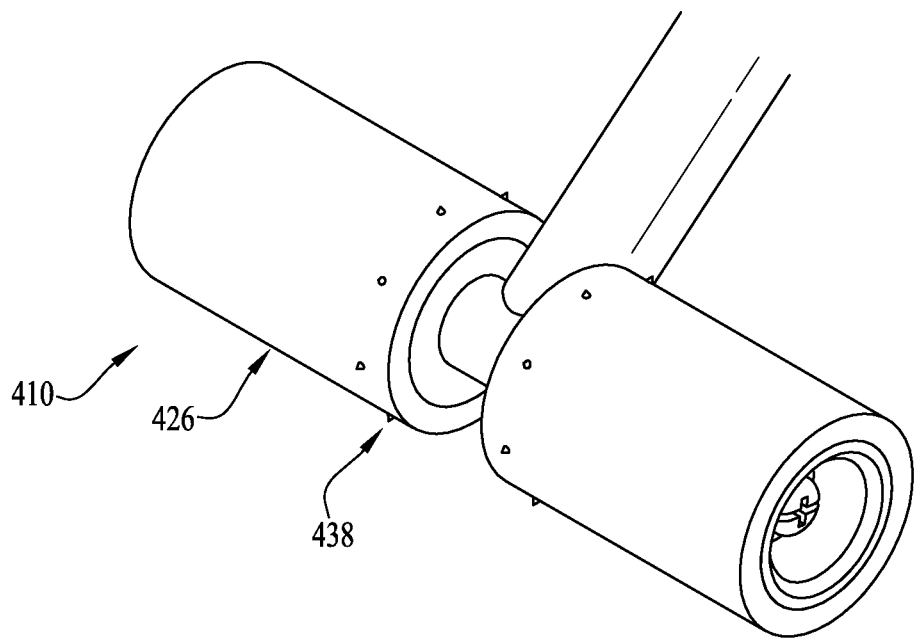
FIG. 15 is a perspective view of a distal/roller portion of a compression roller device according to a fifth example embodiment, showing the markers being spike-shaped.
Figure 16:
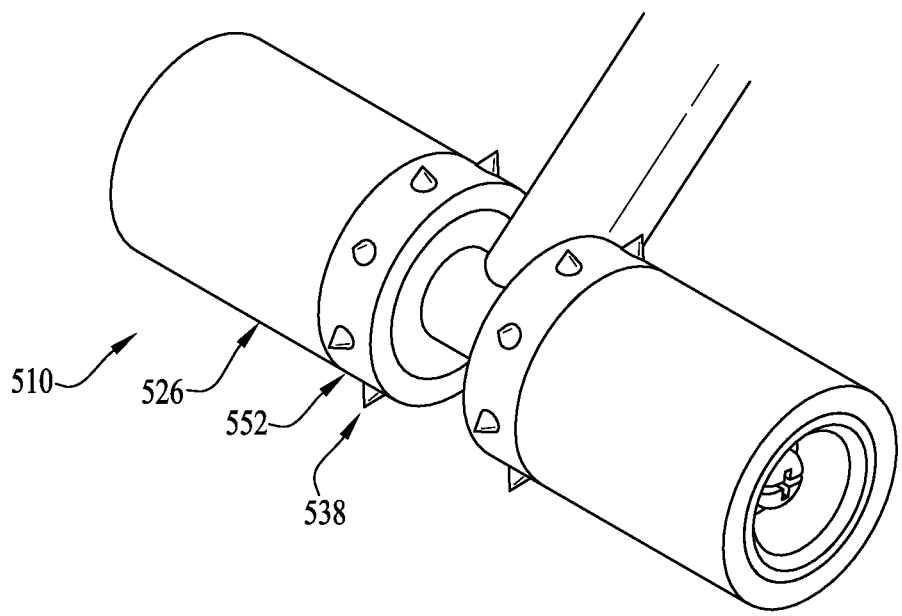
FIG. 16 is a perspective view of a distal/roller portion of a compression roller device according to a sixth example embodiment, showing the markers being spike-shaped and extending from external rings on the roller heads.

FIGS. 12-16 show various other roller assemblies 12 of compression roller devices according to various other example embodiments of the invention. FIG. 12 shows a distal portion of a compression roller device 110 according to a second example embodiment and having L-shaped markers 138. FIG. 13 shows a portion of a compression roller device 210 according to a third example embodiment and having I-shaped (dash-like) markers 238. FIG. 14 shows a distal portion of a compression roller device 310 according to a fourth example embodiment and having combination I-shaped markers 338 and diamond-patterned roller surface markers (e.g., treads) 339. FIG. 15 shows a distal portion of a compression roller device 410 according to a fifth example embodiment and having spike-shaped markers 438 extending from the roller heads 426 (e.g., extending from marking rings positioned underneath the roller heads with the spikes extending through openings in the roller-head outer surface). And FIG. 16 shows a distal portion of a compression roller device 510 according to a sixth example embodiment and having spiked markers 538 extending from the roller heads 526 (e.g., extending from marking rings 552 externally positioned on the roller heads 526).

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A compression roller device for use in building construction to compress an adhesive tape that overlaps edge portions of adjacent coplanar panels and covers a seam therebetween, the roller device comprising:
   a handle having a proximal end portion with a user grip and a distal end portion opposite the proximal end portion; and
   a roller assembly attached to the handle distal-end portion and including two roller heads each having one or more respective stamp markers, wherein the roller heads are axially aligned and spaced apart with the handle distal-end portion positioned therebetween and with the roller heads rotationally mounted to opposite sides of the handle distal-end portion,
   wherein the stamp markers on the two roller heads are spaced apart laterally so that the respective markers can be positioned over the respective edge portions of the adjacent coplanar panels but not over the seam between the panels,
   wherein the stamp markers are spaced apart by a width of about 2.75 inches to about 3.25 inches,
   wherein the roller heads each have an outer contacting surface beyond which the stamp markers extend and that is more resilient than the stamp markers so that the outer contacting surface resiliently deflects to contact and compress the tape whether the tape and the underlying panel edge portions are flat or not, but the stamp markers do not resiliently deflect and instead they mark the tape with visual indicia during compression-rolling use in a single step,
   wherein the stamp markers are configured to form the visual indicia as indentation marks pressed into the tape but not to puncture the tape,
   wherein in compression-rolling use the two roller heads compression-adhere the tape to the edge portions of the adjacent coplanar panels to seal the seam therebetween and the stamp markers on the two roller heads form two spaced-apart series of the visual indicia on the tape with the visual indicia positioned on both sides of the seam between the panels and with the visual indicia being visually discernable for determining that the tape has been properly compression-rolled on and adhered to both edge portions of the adjacent panels to seal the seam therebetween.

2. The compression roller device of claim 1, wherein the tape has a thickness, and wherein in compression-rolling use the stamp markers extend radially outward beyond the roller heads by a height that is less than or substantially equal to the thickness of the tape.

3. The compression roller device of claim 1, wherein the stamp markers are configured to form the visual indicia so that they are readily visually discernable to the naked eye in typical daylight conditions, with the visual indicia having a shape conforming to a shape of the stamp markers.

4. The compression roller device of claim 3, wherein the stamp markers each include two or more linear portions that are angled relative to each other, an outer surface and an extension surface that are angled relative to each other, or both.

5. The compression roller device of claim 1, wherein the tape material has a width, wherein the stamp markers are laterally spaced apart by a width that is less than the tape width, and the spaced-apart stamp markers are positioned axially/laterally inward from outer opposite ends of the roller heads.

6. The compression roller device of claim 1, wherein a recess is formed between the two spaced-apart roller heads and the handle distal portion for clearance so that the recess can receive any protruding fasteners underlying the tape as the roller heads compression-roll over laterally outward longitudinal portions of the tape.

7. The compression roller device of claim 1, wherein the outer contacting surfaces of the roller heads are made of a plastic material and the markers are made of a metal material.

8. The compression roller device of claim 1, wherein the stamp markers extend radially outward beyond the roller surface by no more than about 0.012 inch.

9. A compression roller device for use in building construction to compress an adhesive tape that overlaps edge portions of adjacent coplanar panels and covers a seam therebetween, the roller device comprising:
   a handle having a proximal end portion with a user grip and a distal end portion opposite the proximal end portion; and
   a roller assembly attached to the handle distal-end portion and including two roller heads each having one or more respective stamp markers, wherein the roller heads are axially aligned and spaced apart with the handle distal-end portion positioned therebetween and with the roller heads rotationally mounted to opposite sides of the handle distal-end portion,
wherein the stamp markers on the two roller heads are spaced apart laterally so that the respective markers can be positioned over the respective edge portions of the adjacent coplanar panels but not over the seam between the panels, wherein the roller heads each have an outer contacting surface beyond which the stamp markers extend and that is more resilient than the stamp markers so that the outer contacting surface resiliently deflects to contact and compress the tape whether the tape and the underlying panel edge portions are flat or not, but the stamp markers do not resiliently deflect and instead they mark the tape with visual indicia during compression-rolling use in a single step,
wherein the stamp markers are configured to form the visual indicia as indentation marks pressed into the tape but not to puncture the tape,
wherein at least one of the roller assemblies includes at least one marking ring mounted to at least one of the roller heads, wherein at least one of the stamp markers extends from the marking ring, and wherein the marking ring has a radius that is less than a radius of the roller head,
wherein in compression-rolling use the two roller heads compression-adhere the tape to the edge portions of the adjacent coplanar panels to seal the seam therebetween and the stamp markers on the two roller heads form two spaced-apart series of the visual indicia on the tape with the visual indicia positioned on both sides of the seam between the panels and with the visual indicia being visually discernable for determining that the tape has been properly compression-rolled on and adhered to both edge portions of the adjacent panels to seal the seam therebetween.

10. The compression roller device of claim 9, wherein the radius of the roller head is less than a radius of the marker.

11. A compression roller device for use in building construction to compress an adhesive sheet-like material overlapping with at least edge portions of adjacent building-construction panels and covering a seam therebetween, the panels secured to frame members by building-construction fasteners, the roller device comprising:
   a handle having a proximal end portion with a user grip and a distal end portion opposite the proximal end portion; and
   a roller assembly including two roller heads that are axially aligned so that they both compress the sheet-like material at the same time to adhere the sheet-like material to the adjacent panels,
wherein the two roller heads are spaced apart with the handle distal-end portion positioned therebetween and with the roller heads rotationally mounted to opposite sides of the handle distal-end portion leaving outer opposite ends of the roller heads free of any handle-mounting element, wherein a recess is formed between the two spaced-apart roller heads and the handle distal-end portion for clearance with the recess having a width of about 0.5 inches to about 1.0 inch to provide lateral clearance so that the recess can receive any protruding ones of the building-construction fasteners that are installed in the edge portions of the adjacent panels, laterally offset from edges of the panels forming the seam, and underlying the sheet-like material as the two roller heads simultaneously contact and compression-roll over the sheet-like material with the recess passing over the building-construction fasteners at the panel edge portions and passing over the seam between the panels, and
wherein the two roller heads each include one or more respective markers, wherein the roller heads each have an outer contacting surface beyond which the markers extend and that is more resilient than the markers so that the outer contacting surface resiliently deflects to contact and compress the sheet-like material whether the sheet-like material is flat or not, but the markers do not resiliently deflect and instead they mark the sheet-like material with the visual indicia during compression-rolling use in a single step,
wherein in compression-rolling use the markers on the two roller heads form two series of spaced-apart visual indicia on the sheet-like material with the visual indicia on both sides of the seam between the panels and with the visual indicia being visually discernable for determining that the sheet-like material has been properly compression-rolled on and adhered to both edge portions of the adjacent panels.

12. The compression roller device of claim 11, wherein the markers are provided by stamp elements and the visual indicia formed thereby are indentation marks pressed into the sheet-like material.

13. The compression roller device of claim 12, wherein the sheet-like material has a thickness, wherein the stamp-element markers are configured so that, in compression-rolling use, they form the indentation-mark indicia in the sheet-like material but do not penetrate the sheet-like material.

14. The compression roller device of claim 13, wherein in compression-rolling use the stamp-element markers extend radially outward beyond the roller heads by a height that is less than or substantially equal to the thickness of the sheet-like material.

15. The compression roller device of claim 12 wherein the markers are configured to form the visual indicia so that they are readily visually discernable, wherein the stamp-element markers each include two or more linear portions that are angled relative to each other, an outer surface and an extension surface that are angled relative to each other, or both.

16. The compression roller device of claim 11, wherein the sheet-like material is construction tape used in panel-and-tape systems and having a width, wherein the markers are spaced apart by a width that is less than the sheet-like material width, and the spaced-apart markers are positioned axially/laterally inward from outer opposite ends of the roller heads.

17. The compression roller device of claim 16, wherein the markers are spaced apart by a width of about 2.75 inches to about 3.25 inches.

18. A compression roller device for use with a sheet-like material, the roller device comprising:
   a handle having a proximal end portion with a user grip and a distal end portion opposite the proximal end portion; and
   a roller assembly including two roller heads each having a marking ring and one or more respective stamp markers, with the marking ring mounted to the roller head, with at least one of the stamp markers extending from the marking ring, and with the marking ring having a radius that is less than a radius of the roller head, which is less than a radius of the marker, wherein the roller heads are axially aligned and spaced apart with the handle distal-end portion positioned therebetween and with the roller heads rotationally mounted to opposite sides of the handle distal-end portion, and wherein in compression-rolling use the markers form visual indicia on the sheet-like material that are visually discernable for determining that the sheet-like material has been properly compression-rolled.

19. A compression roller device for use in building construction to compress an adhesive tape that overlaps edge portions of adjacent coplanar panels and covers a seam therebetween, the roller device comprising;
   a handle having a proximal end portion with a user grip and a distal end portion opposite the proximal end portion; and
   a roller assembly attached to the handle distal-end portion and including two roller heads each having one or more respective stamp markers, wherein the roller heads are axially aligned and spaced apart with the handle distal-end portion positioned therebetween and with the roller heads rationally mounted to opposite sides of the handle distal-end portion, wherein recess is formed between the two spaced-apart roller heads and the handle distal-end portion to provide lateral clearance so that the recess can receive any protruding ones of the building-construction fasteners that are installed in the edge portions of the adjacent panels, wherein the recess between the spaced-apart rollers has a width of about 0.5 inches to about 1.0 inches,
   wherein the stamp markers on the two roller heads are spaced apart laterally so that the respective markers can be positioned over the respective edge portions of the adjacent coplanar panels but not over the seam between the panels, wherein the roller heads each have an outer contacting surface beyond which the stamp markers extend and that is more resilient than the stamp markers so that the outer contacting surface resiliently deflects to contact and compress the tape whether the tape and the underlying panel edge portions are flat or not, but the stamp markers do not resiliently deflect and instead they mark the tape with visual indicia during compression-rolling use in a single step, wherein the stamp markers are configured to form the visual indicia as indentation marks pressed into the tape but not to puncture the tape,
   wherein in compression-rolling use the two roller heads compression-adhere the tape to the edge portions of the adjacent coplanar panels to seal the seam therebetween and the stamp markers on the two roller heads form two spaced-apart series of the visual indicia on the tape with the visual indicia positioned on both sidess of the seam between the panels and with the visual indicia being visually discernable for determining that the tape has been properly compression-rolled on and adhered to both edge portions of the adjacent panels to seal the seam therebetween.

20. The compression roller device of claim 19, wherein the markers are spaced apart by a width of about 2.75 inches to about 3.25 inches.

\* \* \* \* \*